Dec. 5, 1933.  J. H. ELLIOTT ET AL  1,938,286
JOINT FOR PIPES, TUBES, AND THE LIKE
Filed July 28, 1932
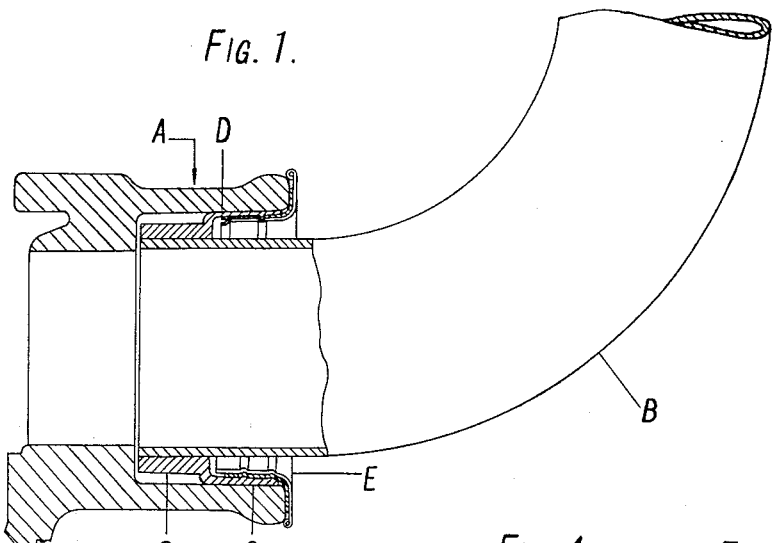
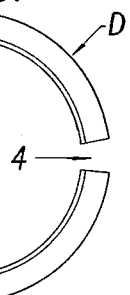
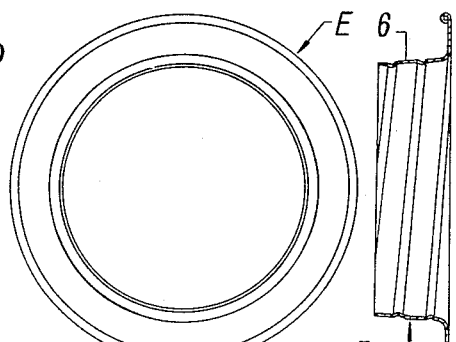
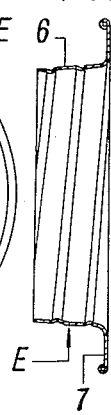
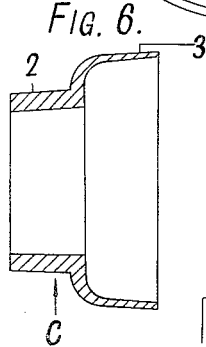
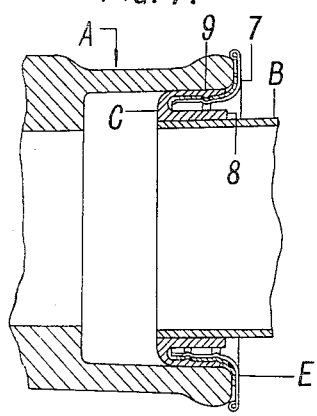
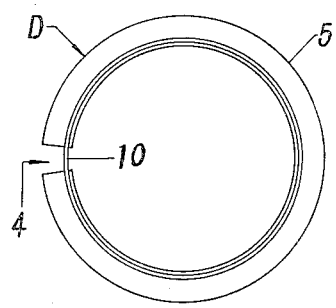
INVENTORS
Joseph Henderson Elliott
Isabella Duncan Jack
BY
Ritter, Mechlin & O'Neill
ATTORNEYS Patented Dec. 5, 1933

1,938,286

UNITED STATES PATENT OFFICE 1,938,286

JOINT FOR PIPE, TUBES, AND THE LIKE

Joseph Henderson Elliott and Isabella Duncan Jack, Glasgow, Scotland

Application July 28, 1932, Serial No. 625,450, and in Great Britain August 7, 1931

5 Claims. (Cl. 285—163)

This invention refers to means for making joints for connecting pipes, tubes and the like, hereinafter referred to generally as pipes, particularly joints which are suitable for use under conditions where the pipes connected are subject to small vibrational movements laterally or endwise, or to small relative movements which may be due or partly due to expansion and contraction; further, to joints which are suitable for connecting metal pipes with devices composed of material of a nature more fragile than metal, for example, with devices composed of earthenware, porcelain, glass, or compositions which generally may fracture more easily than metal, such joints, for example, being particularly suitable for connecting a metal pipe with the socket of a sanitary closet.

In making joints of the kind to which this invention refers a resilient packing device, composed say of rubber, is used comprising a tubular part which, for making the joint, is expanded outwardly into a circular socket, and the principal object of this invention is to provide an improved expander composed of metal, by the use of which compression of the tubular part of the packing within the socket may be more suitable to conditions where the inner surface of the socket does not conform truly to the circular, the expander being more suitable in that it can yield so as to accommodate itself to some extent to irregularity from the circular which there may be in the inner surface of the socket.

According to this invention the expander provided is composed of thin sheet metal which normally is incompressible but which is distortable, being distortable in the process of effecting expansion for making the joint. For example, the metal of which the expander is composed may be brass, alloys of aluminium, or the like.

Means according to this invention also comprise a liner of tubular character which is readily expansible being, for example, divided, and which is distortable. For instance, the liner may be composed of thin sheet metal similar to that of the expander and consist of one tubular convolution having free ends, which ends before expansion overlap or are contiguous or near one another. The liner may be divided longitudinally, helically, or otherwise. The expander is formed for insertion into the liner, and in operation the expander acts to produce the expansion. Thus, the expander may be conical of form, and, for introducing the expander into the liner, the expander and the liner may be formed with screw thread surfaces, say by spinning.

With a resilient packing device having an outer tubular part for expansion outwardly into a circular socket, the packing is applied to the pipe, and then, in accordance with this invention, the liner is inserted into the bore of the outer tubular part of the packing, and, with the packing and liner in the socket, the expander is inserted. The outer tubular part of the resilient packing device may be of comparatively thin material and is associated with a circular part to embrace the pipe. The resilient packing device may also have an inner tubular part to embrace the pipe, but this is not essential, although it may be preferable so as to give a longer joint around the pipe. The two tubular parts of the resilient packing device may extend endwise in one and the same direction, say, outwardly, or they may extend endwise in opposite directions. The inner tubular part may be comparatively thick and while embracing the pipe be appreciably expanded.

The liner and the expander may have provision for facilitating their manipulation, for example, either member may be flanged so that it can be turned or be held against turning.

Auxiliary resilient packing may be provided for use in conjunction with sockets of slightly varying size.

Some examples according to this invention will now be described with reference to the accompanying drawing, in which:—

Figure 1 is a longitudinal section showing a first example of a joint completed.

Figure 2 is a longitudinal section and Figure 3 is an end elevation showing a liner.

Figure 4 is an end elevation and Figure 5 is a longitudinal section showing an expander.

Figure 6 is a longitudinal section showing a resilient packing device.

Figure 7 is a longitudinal section showing a second example of a joint completed.

Figure 8 is an end elevation showing a liner with auxiliary resilient packing applied thereto.

The drawing shows the socket A of a sanitary closet composed say of earthenware and its flush pipe B composed say of metal.

In the first example, see Figures 1, 2, 3, 4, 5 and 6, the resilient packing device C comprises tubular parts 2 and 3, which extend in opposite directions. The internal diameter of the part 2, which is such that it will firmly embrace the pipe B, is smaller than the internal diameter of the part 3, and the walls of the part 2 are appreciably thicker than those of the part 3. The liner D, composed of thin sheet metal, brass, alloys of aluminium or the like, is divided longitudinally at 4, is screw threaded and has a flange 5. The expander E, composed of thin sheet metal, has a tubular part 6, which is slightly conical, is screw threaded and has a flange 7. In making the joint, see Figure 1, the expander E is passed on to the pipe B, then the liner D, and then the packing C. The end of the pipe is inserted into the socket A, the liner D is moved endwise into the annular space which there is between the outside surface of the pipe and the part 3, and the expander E is screwed into the liner. The expander E expands the liner D and the part 3 of the packing C is compressed against the inner surface of the socket A. The liner and expander, being made of thin metal, are distortable, and thus can yield and accommodate themselves to some extent to irregularity of the inner surface of the socket and apply more uniform compression to the part 3.

In the second example, see Figure 7, the resilient packing device C has an inner tubular part 8 and an outer tubular part 9 extending in one and the same direction outwardly.

Figure 8 shows a liner D with auxiliary resilient packing 10, composed of rubber.

We claim:—

1. For making a joint for connecting pipes in the making of which a resilient packing device is used comprising a tubular part which is expanded outwardly, means comprising a liner, which is expansible outwardly and distortable, and an expander, which is composed of thin sheet metal which normally is incompressible but which is distortable, the expander being formed for insertion into the liner and to operate to produce expansion outwardly of the liner and compression of said tubular part of the packing device.

2. For making a joint for connecting pipes in the making of which a resilient packing device is used comprising a tubular part which is expanded outwardly, means comprising a liner of tubular character which is divided and distortable, and a tubular expander which is composed of thin sheet metal which normally is incompressible but which is distortable, the expander being formed for insertion into the liner and to operate to produce expansion outwardly of the liner and compression of said tubular part of the packing device.

3. For making a joint for connecting pipes in the making of which a resilient packing device is used comprising a tubular part which is expanded outwardly, means comprising a liner of tubular character which is divided and distortable, and a tubular expander, which is conical and is composed of thin sheet metal which normally is incompressible but which is distortable, the expander being formed for insertion into the liner and to operate to produce expansion outwardly of the liner and compression of said tubular part of the packing device.

4. For making a joint for connecting pipes in the making of which a resilient packing device is used comprising a tubular part which is expanded outwardly, means comprising a liner of tubular character which is divided and distortable, and a tubular expander which is composed of thin sheet metal which normally is incompressible but which is distortable, the liner and expander being formed with screw thread surfaces, and the expander being formed for insertion into the liner and to operate to produce expansion outwardly of the liner and compression of said tubular part of the packing device.

5. For making a joint for connecting pipes in the making of which a resilient packing device is used comprising a tubular part which is expanded outwardly, means comprising a liner of tubular character which is divided and distortable, and a tubular expander which is conical and is composed of thin sheet metal which normally is incompressible but which is distortable, the liner and expander being formed with screw thread surfaces, and the expander being formed for insertion into the liner and to operate to produce expansion outwardly of the liner and compression of said tubular part of the packing device.

JOSEPH HENDERSON ELLIOTT.
ISABELLA DUNCAN JACK.